UNITED STATES PATENT OFFICE.

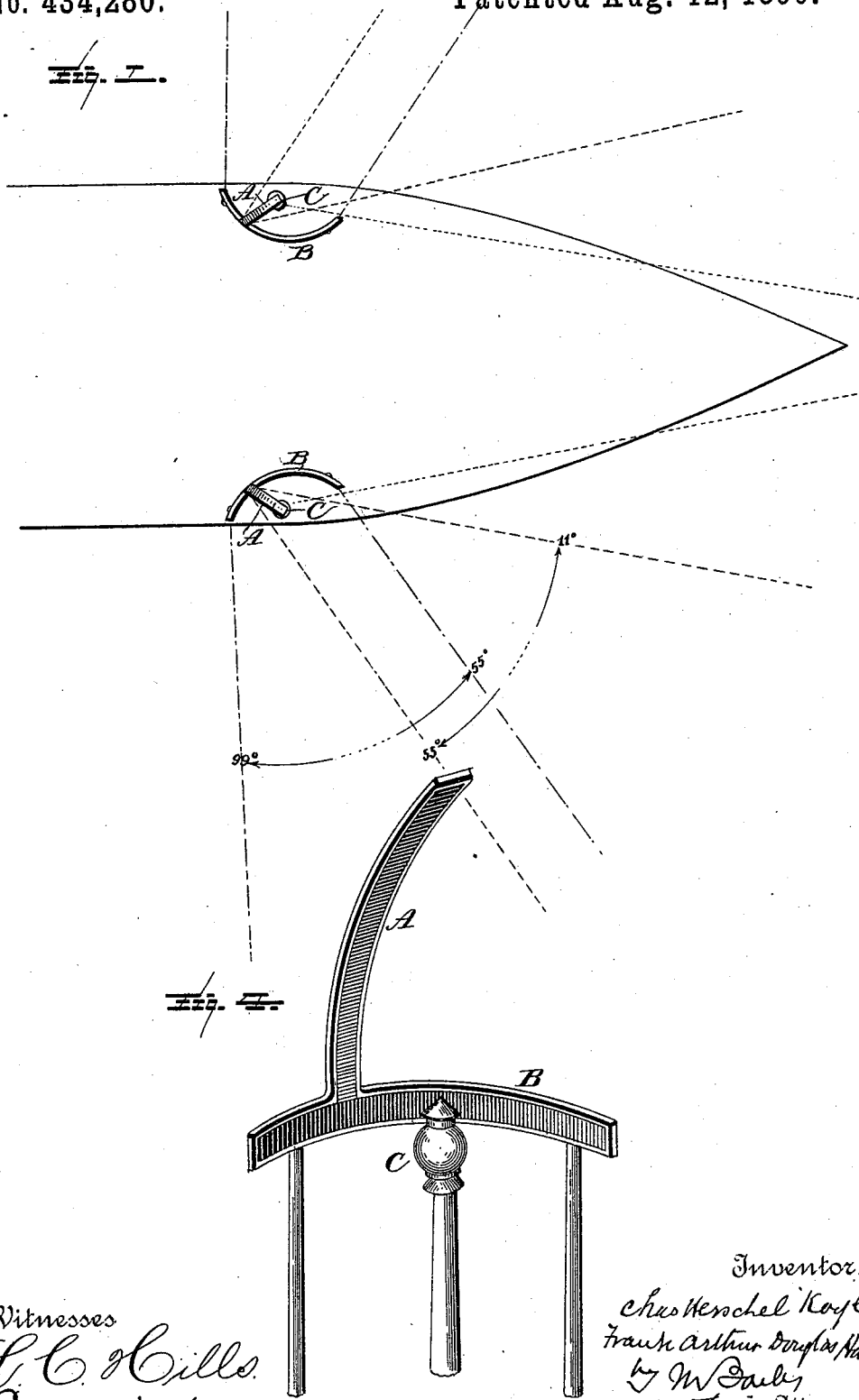

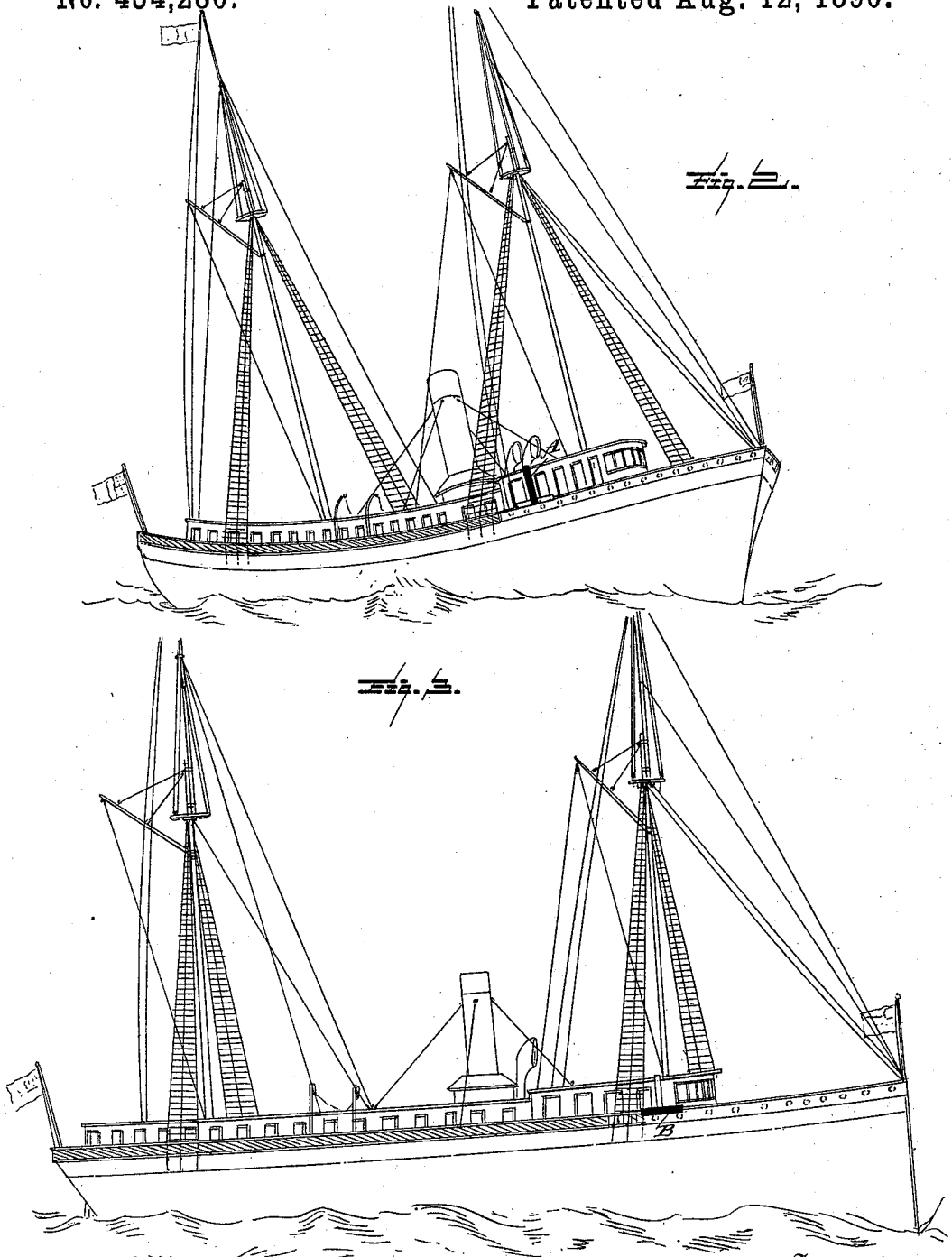

CHARLES HERSCHEL KOYL, OF EASTON, PENNSYLVANIA, AND FRANK ARTHUR DOUGLAS HANCOCK, OF SAVANNAH, GEORGIA.

SIGNAL-LIGHT FOR VESSELS.

SPECIFICATION forming part of Letters Patent No. 434,280, dated August 12, 1890.

Application filed May 22, 1890. Serial No. 352,778. (No model.)

*To all whom it may concern:*

Be it known that we, CHARLES HERSCHEL KOYL, of Easton, in the State of Pennsylvania, and FRANK ARTHUR DOUGLAS HANCOCK, of Savannah, in the State of Georgia, have invented certain new and useful Improvements in Signal-Lights for Vessels, of which the following is a specification.

Under the ordinary code of signal-lights now in vogue for vessels under way the observer in approaching a vessel "bow on," or within, say, about one point of bow on, would see the two ordinary round colored lights at present in use—green upon starboard, red upon port—and knowing by this that a vessel is approaching him on a course directly opposite to the one he is steering would govern himself accordingly; but in approaching a vessel on either bow when only a single light—red or green, as the case may be—is seen then the observer would know that the course of the approaching vessel was at an angle to his own; but while he would know this much in a general way he would be wholly unable on a dark night to determine the angle of approach and thus to take timely precaution to avoid collision. For the purpose of enabling the observer to more accurately determine the angle of approach various plans have been from time to time suggested, all contemplating the use of some auxiliary light or lights in conjunction with the ordinary red and green lights required by law. One of the more recent plans is to provide, in conjunction with the usual port and starboard lights, auxiliary lights of the same color as the main lights to which they respectively pertain, these lights being separated by screens which shut off the rays from ahead, but allow the lights to be seen from the side, the arrangement being such that as the vessel turns in her course a greater or less number of these lights will be exposed, thus affording an indication of the direction of angle of approach.

What we propose is also to use auxiliary lights in conjunction with those now required by law. The auxiliary lights which we employ, however, do not resemble and are in no sense the same as the ordinary red and green lights; nor for the results we obtain do we depend upon variations in the number of lights visible at any one time.

The auxiliary light which we use as a direction-indicator is furnished by a reflector, the surface of which has the contour or approximately the contour of the longitudinal segment of a paraboloid, the light or lamp whose flame is to be reflected being located at a point corresponding to the focus of the paraboloid of which said reflector is a segment. A reflecting-surface of the form specified has the property of making parallel all rays reflected by it, the consequence being that we can thus obtain a solid band of light of definite dimensions. This band should be of such dimensions as to be seen by the observer within any conventional or agreed-upon number of points—say, for example, four points, or about forty-five degrees. For this purpose the curvature of the paraboloidal section should be slightly modified, so that there will be sufficient divergence of the reflected rays to permit the band of light to be seen within this range on each side of the vessel specified. By placing one of these reflectors so that it will give a vertical band of light and then another so that it will give a horizontal band of light, the lamps for these reflectors being red or green, according to the color of the ordinary signal-lights in conjunction with which they are used, and then by so locating the vertical reflector and regulating its divergence that it can be seen as a vertical band of light only from one point to five points from bow on—that is to say, when approaching the vessel at an angle of from eleven degrees to fifty-five degrees with her keel—and by so locating the horizontal reflector and regulating its divergence that it can be seen as a horizontal band of light only from five to nine points from bow on, then, we say, by thus locating these reflectors one band of light only would be seen at a time, and according as this was vertical or horizontal the observer could determine the angle of approach with sufficient accuracy to enable him to intelligently take such measures as necessary in order to avoid collision.

By arranging the two paraboloidal segments on each side in the form of a cross one lamp will serve for the pair, whose axes are so located as to make with each other the requisite angle, the lamp of course being placed in the focus common to the paraboloids. This same lamp, indeed, may also serve, in addition, as the ordinary conventional light required by law. Such lamp would be constructed, as usual, on the side from the vessel and on the other side would present to the paraboloidal reflectors segments of Fresnel lenses adapted to each reflector and therefore running at right angles to each other in the lamp. We do not confine ourselves, of course, to any particular number of these paraboloidal reflecting-segments, nor to their special arrangement with relation to each other; but the arrangement which at present we prefer is that which is above outlined, and which is illustrated in the accompanying drawings, to which reference will now be made.

In the drawings, Figure 1 is a diagrammatic view indicating the ranges within which it is supposed that the several lights are respectively distinctively visible. Figs. 2 and 3 are views indicating the positions assumed by the band of light when visible. It is of course impracticable under the present rules and regulations of the United States Patent Office to represent in these and the other figures the colors themselves of the bands. Fig. 4 is a perspective view of a signal in which the two paraboloidal segments are crossed and so placed that the lamp by which they are illuminated will be in a focus common to the two paraboloids of which they are segments.

The vertical paraboloidal reflecting-segment is indicated at A, and the horizontal segment at B. The lamp is shown at C. Each reflector consists of a reflecting-surface inclosed, like a looking-glass, in a strong frame, which may be of metal or other suitable material. When the two segments are placed, as in Fig. 4, with the lamp located at their common focus, the horizontal segment will form in effect the box or frame by which the lamp, so far as its functions as a signal are concerned, will be shielded on the side and back, as usual in the case of colored signal side lights.

We have hereinbefore indicated that each segment should be visible through a certain range or number of points, and that for this purpose it will be desirable to somewhat modify its shape from that of a mathematically-exact paraboloidal segment. This can readily be done by slightly modifying the longitudinal curvature of the horizontal segment and the transverse curvature of the vertical segment, so that at the requisite distance there will be sufficient divergence of the rays to produce a beam or band of light which will be visible through the predetermined range of points, and to increase the vertical range in which the segments will be visible as bands of lights the transverse curvature of the horizontal segment and the longitudinal curvature of the vertical band can also be modified. To accomplish this result in both cases, however, the modification in the form of the reflector need be very slight, and it remains to all intents and purposes of the contour of the segment of a paraboloid.

The reflecting-surface may be either smooth and plain, as in Letters Patent No. 384,170, of June 5, 1888, to C. H. Koyl, one of the applicants herein, or corrugated, as described in Letters Patent No. 410,598, of September 10, 1889, subsequently granted to said Koyl.

Having described our invention and the manner in which the same is or may be carried into effect, we state, in conclusion, that we do not restrict ourselves to the details herein set forth, for manifestly the same can be very considerably varied in a number of particulars without departure from the spirit of the invention; but

What we claim herein as new and of our invention is as follows:

1. In signal-lights for vessels, the combination, with the usual colored port and starboard lights, of colored supplementary side lights visible only through a range including a predetermined number of points to port or starboard, respectively, and consisting of reflectors having the contour or approximately the contour of the segment of a paraboloid fixed in the position in which they will be visible throughout the range prescribed, and lamps located at points corresponding to the foci of the paraboloids of which the said reflectors are segments, substantially as and for the purposes hereinbefore set forth.

2. In signal-lights for vessels, two or more reflectors, formed as paraboloidal segments, placed on the side of the vessel at an angle to each other, so that the band of light reflected by one shall be at an angle to the band of light reflected by the other, and located and formed so that each shall be visible through a range of points different from that through which the other is visible, in combination with a lamp or lamps located at focal distance from said reflectors, substantially as and for the purposes hereinbefore set forth.

3. In signal-lights for vessels, the combination of crossed or intersecting paraboloidal reflecting-segments, formed and located on the vessel so that each shall be visible through a range of points different from that through which the other is visible, with a lamp located in the common focus of the paraboloids of which said reflectors are segments, substantially as and for the purposes hereinbefore set forth.

4. The combination, with the two crossed or intersecting paraboloidal reflecting-segments, of a lamp located in their common focus, serving at once both to illuminate the said reflecting-sections and also as the ordinary conventional port or starboard colored signal-light, as the case may be, substantially as and for the purposes hereinbefore set forth.

5. In signal-lights for vessels, a direction-indicator consisting of a paraboloidal reflecting-segment formed and located or fixed on the vessel, as described, so as to be visible from the side as a band of light through a range including a predetermined number of points only, and a lamp located at a point corresponding to the focus of the paraboloid of which the reflector is a segment, substantially as and for the purposes hereinbefore set forth.

In testimony whereof we have hereunto set our hands this 14th day of April, A. D. 1890.

CHARLES HERSCHEL KOYL. [L. S.]
FRANK ARTHUR DOUGLAS HANCOCK. [L. S.]

Witnesses:
 CORMACK HOPKINS,
 M. A. COHEN.